United States Patent
Johnson et al.

(10) Patent No.: US 11,263,706 B2
(45) Date of Patent: Mar. 1, 2022

(54) CONTROLLING A BOUNDED CONFIDENCE OPINION MODEL WITH A DYNAMIC POPULATION

(71) Applicant: HRL Laboratories, LLC, Malibu, CA (US)

(72) Inventors: Samuel D. Johnson, Santa Monica, CA (US); Dana M. Warmsley, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 81 days.

(21) Appl. No.: 16/825,347

(22) Filed: Mar. 20, 2020

(65) Prior Publication Data

US 2021/0019840 A1     Jan. 21, 2021

Related U.S. Application Data

(60) Provisional application No. 62/874,866, filed on Jul. 16, 2019.

(51) Int. Cl.
*G06Q 10/00*     (2012.01)
*G06Q 50/00*     (2012.01)
*H04L 51/043*    (2022.01)
*H04L 51/52*     (2022.01)

(52) U.S. Cl.
CPC .......... *G06Q 50/01* (2013.01); *H04L 51/043* (2013.01); *H04L 51/32* (2013.01)

(58) Field of Classification Search
CPC .... G06Q 50/01; G06Q 10/063; G06Q 10/101; G06Q 10/00; H04L 51/043; H04L 51/32
See application file for complete search history.

(56) References Cited

U.S. PATENT DOCUMENTS

| | | | |
|---|---|---|---|
| 10,579,734 B2 * | 3/2020 | Assa | G06F 40/30 |
| 2010/0121849 A1 * | 5/2010 | Goeldi | G06Q 50/01 |
| | | | 707/736 |
| 2013/0179510 A1 * | 7/2013 | Hull | H04L 51/32 |
| | | | 709/204 |
| 2014/0337328 A1 * | 11/2014 | Sarvabhotla | G06F 16/338 |
| | | | 707/723 |

(Continued)

OTHER PUBLICATIONS

"Herd behavior and the quality of opinions". Shinji Teraji Department of Economics, Yamaguchi University, 1677-1 Yoshida, Yamaguchi 753-8514, Japan Accepted Oct. 14, 2003. doi:10.1016/j.socec.2003.10.004.*

(Continued)

*Primary Examiner* — Gabrielle A McCormick
(74) *Attorney, Agent, or Firm* — Tope-McKay & Associates (57) ABSTRACT

Described is a system for guiding opinions of users of a social media network. The system determines a number of control agents to be inserted into a population of users of the social media network. The system also determines a rate at which an expressed opinion of each control agent should change over a period of time. A control strategy is output which includes a control schedule based on the number of control agents to be inserted into the population of users and the rate at which the expressed opinion of each control agent should change over the period of time. Finally, the control schedule is deployed in the social media network.

15 Claims, 7 Drawing Sheets

(56) References Cited

U.S. PATENT DOCUMENTS

| | | | | |
|---|---|---|---|---|
| 2015/0046454 | A1* | 2/2015 | Anders | G06Q 50/01 707/737 |
| 2016/0034973 | A1* | 2/2016 | Soni | G06Q 30/0269 705/14.66 |
| 2018/0047114 | A1* | 2/2018 | Haaland | G06Q 50/01 |
| 2018/0198749 | A1* | 7/2018 | Abou Mahmoud | H04L 51/32 |
| 2018/0314760 | A1* | 11/2018 | Cox | G06Q 50/01 |
| 2019/0065610 | A1* | 2/2019 | Singh | H04L 51/32 |

OTHER PUBLICATIONS

Y. Zenou. "Key players." In Y. Bramoulle', A. Galeotti, and B. Rogers, editors, "The Oxford Handbook of the Economics of Networks," Oxford Handbooks, chapter 11, pp. 244-274. Oxford University Press, 2016.

G. Deffuant, D. Neau, F. Amblard, and G. Weisbuch. "Mixing beliefs among interacting agents." Advances in Complex Systems, 3(1): pp. 87-98, 2000.

C. Gilbert and E. Hutto. "Vader: A parsimonious rule-based model for sentiment analysis of social media text." Eighth International Conference on Weblogs and Social Media (ICWSM-14), 2014, pp. 1-11.

S. Goyal, S. Jabbari, M. Kearns, S. Khanna, and J. Morgenstern. "Strategic network formation with attack and immunization." arXiv:1511.05196, Nov. 2015, pp. 1-59.

R. Hegselmann and U. Krause. "Opinion dynamics under the influence of radical groups, charismatic leaders, and other constant signals: A simple unifying model." Networks and Heterogeneous Media, 10(3): pp. 477-509, Sep. 2015.

M. Kearns, M. L. Littman, and S. Singh. "Graphical models for game theory," Jan. 2013, pp. 1-8.

K. Wang and X. Wan. "Sentigan: Generating sentimental texts via mixture adversarial networks." In IJCAI, pp. 4446-4452, 2018.

Notification of Transmittal of the International SearchReport, the International Search Report, and the Written Opinion of the International Searching Authority for PCT/US2020/023946; dated May 14, 2020.

Notification of and the International Preliminary Report on Patentability Chapter II for PCT/US2020/023946; dated Jun. 10, 2021.

* cited by examiner

CONTROLLING A BOUNDED CONFIDENCE OPINION MODEL WITH A DYNAMIC POPULATION

CROSS-REFERENCE TO RELATED APPLICATIONS

The present application is a Non-Provisional Application of U.S. Provisional Application No. 62/874,866, filed in the United States on Jul. 16, 2019, entitled, "Controlling a Bounded Confidence Opinion Model with a Dynamic Population," the entirety of which is incorporated herein by reference.

BACKGROUND OF INVENTION

(1) Field of Invention

The present invention relates to a system for guiding the opinions of social media users, and more particularly, to a system for guiding the opinions of social media users based on identified control strategies.

(2) Description of Related Art

Much of the prior work on opinion control focuses on the "influence maximization" and opinion "seeding" problems in competitive and non-competitive settings, where the main goal is to identify influential individuals in a social network that can maximize the propagation of some desired opinion, as described in Literature Reference Nos. 2 and 4 of the List of Incorporated Literature References. A survey of this approach can be found in Literature Reference No. 5. This work has a number of limitations. For instance, seeding influential nodes is costly and requires active agent participation. Further, in bounded confidence models, "seeding" an initial desirable opinion is less likely than our approach to alter the opinions of agents that differ significantly from the desired opinion since agents with vastly different opinions are not likely to be able to influence each other. Additionally, the approach does not generally solve long-term influence problems since the outcome of the approach is likely to last only for a campaign.

There is also previous work using a link-based approach to opinion control. This method alters the social influence network by making changes to the (weighted) links in the influence network, effectively changing the extent of the "attention" that individuals (nodes) place on another's expressed opinions when updating their own opinions. One drawback of this approach is that is requires social network information, which may not exist. The popular social media platform Reddit™, for example, has no underlying friend or follower network. Additionally, it requires control over agents' communication channels (e.g., Facebook™ newsfeed), which can be costly and is not always possible.

Thus, a continuing need exists for a system that directly solves the problem of identifying control strategies in the context of the opinion dynamics of group-based networks.

SUMMARY OF INVENTION

The present invention relates to a system for guiding the opinions of social media users, and more particularly, to a system for guiding the opinions of social media users based on identified control strategies. The system comprises one or more processors and a non-transitory computer-readable medium having executable instructions encoded thereon such that when executed, the one or more processors perform multiple operations. The system determines a number of control agents to be inserted into a population of users of the social media network. In addition, the system determines a rate at which an expressed opinion of each control agent should change over a period of time. A control strategy is output, wherein the control strategy comprises a control schedule based on the number of control agents to be inserted into the population of users and the rate at which the expressed opinion of each control agent should change over the period of time. Finally, the control schedule is deployed in the social media network.

In another aspect, the system determines a set of input parameters associated with the social media network, determines the number of control agents to be inserted into the population of users using the set of input parameters, and determines the rate at which the expressed opinion of each control agent should change over the period of time using the set of input parameters.

In another aspect, in determining the set of input parameters, the system determines arrival and departure rates of engagement with the social media network for each user in the population of users.

In another aspect, in determining the set of input parameters, the system determines a length of time of engagement with the social media network for each user in the population of users.

In another aspect, in determining the set of input parameters, the system determines a group membership and a rate of inter-group movement for each user in the population of users.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for guiding the opinions of social media users, and more particularly, to a system for guiding the opinions of social media users based on identified control strategies. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. G. Deffuant, D. Neau, F. Amblard, and G. Weisbuch. Mixing beliefs among interacting agents. Advances in Complex Systems, 3(1):87-98, 2000.
2. C. Gilbert and E. Hutto. Vader: A parsimonious rule-based model for sentiment analysis of social media text. Eighth International Conference on Weblogs and Social Media (ICWSM-14), 2014.
3. S. Goyal, S. Jabbari, M. Kearns, S. Khanna, and J. Morgenstern. Strategic network formation with attack and immunization. arXiv:1511.05196, November 2015.
4. R. Hegselmann and U. Krause. Opinion dynamics under the influence of radical groups, charismatic leaders, and other constant signals: A simple unifying model. Networks and Heterogeneous Media, 10(3): 477-509, September 2015.
5. M. Kearns, M. L. Littman, and S. Singh. Graphical models for game theory, January 2013.
6. K. Wang and X. Wan. Sentigan: Generating sentimental texts via mixture adversarial networks. In IJCAI, pages 4446-4452, 2018.
7. Y. Zenou. Key players. In Y. Bramoulle', A. Galeotti, and B. Rogers, editors, The Oxford Handbook of the Economics of Networks, Oxford Handbooks, chapter 11, pages 244-274. Oxford University Press, 2016.

(2) Principal Aspects

Various embodiments of the invention include three "principal" aspects. The first is a system for guiding the opinions of social media users. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
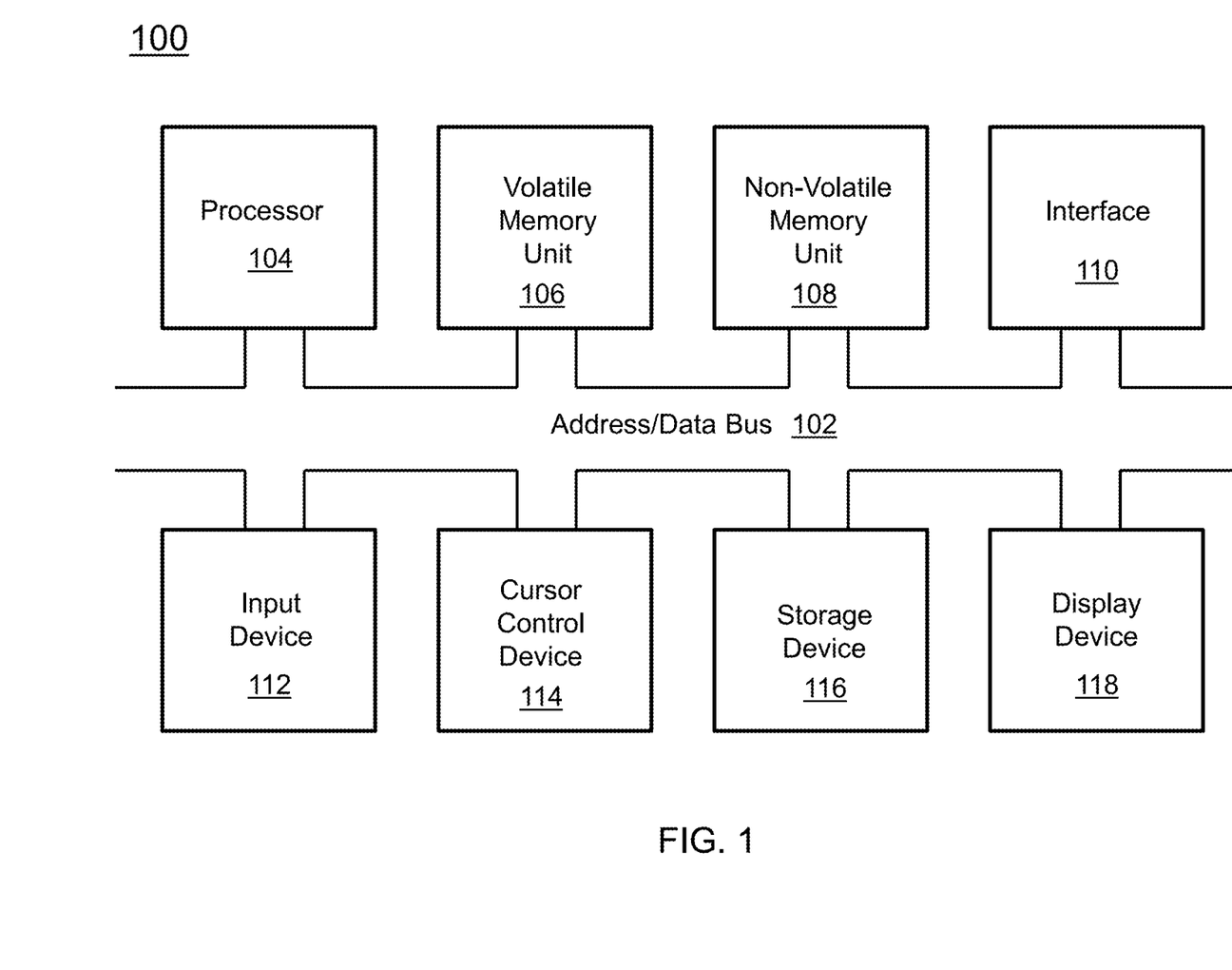
FIG. 1 is a block diagram depicting the components of a system for guiding the opinions of social media users based on identified control strategies according to some embodiments of the present disclosure.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
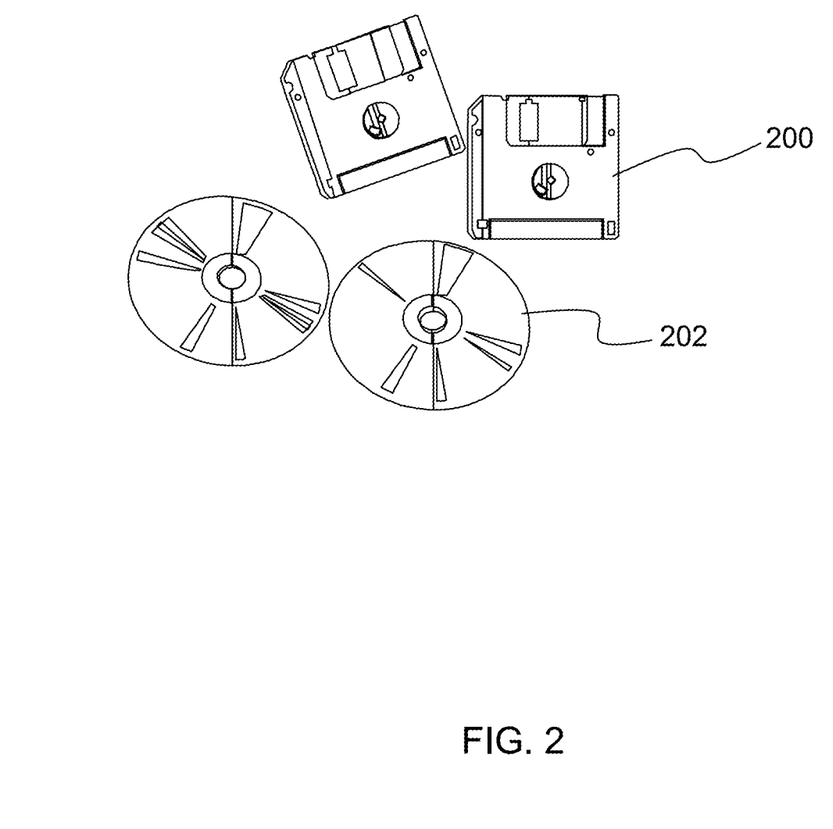
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Described is a system for identifying "opinion control" strategies that will guide the opinions of social media users into a desired regime on community-centric platforms. The control strategies identified by the system involve inserting "control" agents into the population of interest. These control agents express opinions according to a set schedule such that they steer the population's opinion over time. Given an online social media platform, the system identifies the type of control strategy and number of control agents necessary to effectively push the population's opinions toward a target regime within a reasonable amount of time. A target regime is the ideal opinion state as specified by the end user. The system's objective is to get the collective opinions into this regime and keep them there. A non-limiting example of a target regime is where greater than 75% of the voting public favors an assault weapons ban.

The system is built upon a unique group-based opinion dynamics model. The model extends the well-known Bounded Confidence Model (see Literature Reference No. 3) to incorporate agent activity levels, group membership and inter-group movement. With the extension to group-based dynamics, the work of opinion dynamics is extended to platforms that do not offer the type of social network information (e.g., friend and follower relations) used by past opinion dynamics models. The method described herein is also unique in that, unlike with previous work in opinion control, the opinion control strategies according to embodiments of the present disclosure do not require direct intervention in terms of altering agent opinions or changing how they express their opinions.

The system described herein identifies effective opinion control strategies that will guide the opinions of a given population toward a favorable equilibrium state. The system develops opinion control strategies that place a small population of coordinating individuals into a population of regular agents in order to exert influence. Given a social media platform, the system according to embodiments of the present disclosure determines both a control strategy/schedule and number of control agents necessary for success. The algorithm takes as input parameters associated with the given social media network. These include, but are not limited to, arrival/departure rates of individuals, individuals' initial opinions, group membership, and rate of intergroup movement. Given these parameters, the system numerically determines 1) the number of control agents and 2) the rate at which the expressed opinion of controller agents is altered over time. Each of these aspects will be described in detail below.

The invention has a number of advantages over existing methods for opinion control. First, the model uses a unique group-based opinion dynamics model that takes into account how often agents engage with the social media platform, how long they remain engaged, their primary group membership and how they move between groups. As such, it incorporates real-world behaviors that affect each agent's level of exposure to the opinions of other users and, therefore, how they update their opinions over time. This is in contrast to previous models that make the simplifying assumption that a user is always engaged in a platform and is exposed to and aware of all of its neighbors' opinions at all times.

Second, the approach described herein is less costly in comparison to other methods. Unlike previous work in "influence maximization" that involves identifying a subset of influential agents able to maximize the spread of a desired opinion, the method according to embodiments of the present disclosure does not require direct intervention in terms of altering agent opinions or changing how they express their opinions. By inserting control agents into the population, the method relies on the opinions that already exist in the given network and foregoes the cost associated with identifying and directly altering or "seeding" the opinions of existing agents. This approach to social mediation relies on the opinion dynamics themselves to actuate all opinion changes in the population, and does not require any opinions to be implanted ab extra.

Another advantage is that this system identifies control strategies that play out over time. By allowing control agents to express opinions over time, the method described herein is more likely to reach agents with varying activity levels. By allowing control agents to vary the opinions they express, the method is better able to influence agents whose opinions differ significantly from the desired opinion. This is important since two agents whose opinions are far apart are not likely to be able to influence each other or come to a consensus. Control agents that express opinions close to the other agents' own opinions are better able to nudge those opinions in the desired direction, making it possible to affect agents with opinions that exist across a wide spectrum.

Finally, the unique group-based opinion dynamics model expands the types of social media platforms on which one can identify and enact opinion control strategies effectively. Previous methods assume the existence of an underlying social network, which is not the case for major social media platforms such as Reddit™. Since the model described herein can be reduced to a one-group network and parameters can be altered to reflect assumptions made by past models, it can still be applied in many of the same instances as those models and is able to identify control strategies that work well on all types of social media platforms.

In summary, the advantages of the system according to embodiments of the present disclosure include: the ability to be used on varying types of social media platforms, those with and without underlying social network information; identifying control strategies that work over time and are, therefore, able to influence more users; less costly than other methods, does not require altering the population directly; and makes less simplifying assumptions than previous work, representative of real-world dynamics. Specific details are provided below.

(4.1) An Opinion Control Via a Group-Based Opinion Dynamics Model

Figure 3:
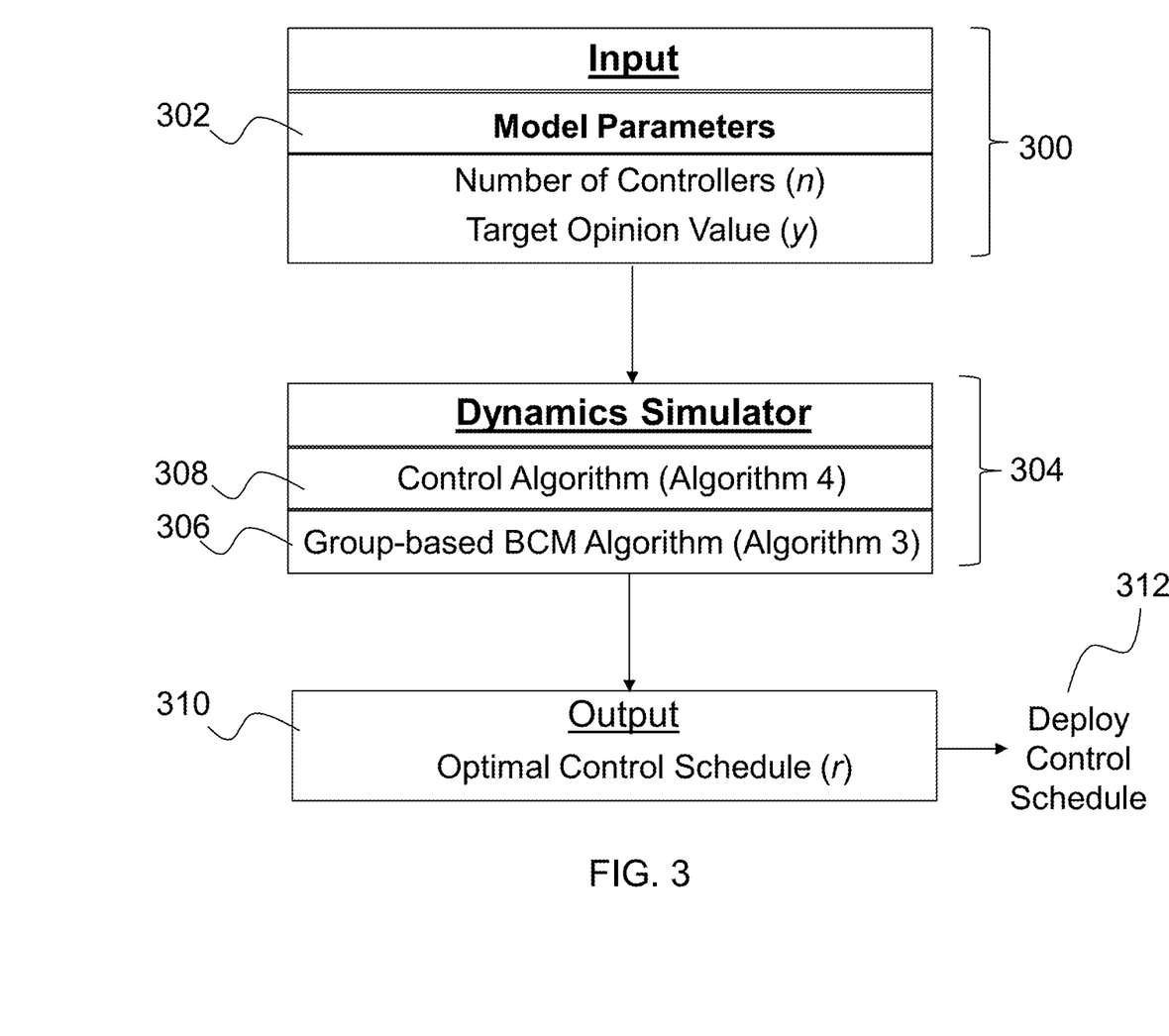
FIG. 3 is a diagram illustrating inputs into the system consisting of model parameters and control objectives, and outputs describing a control strategy according to some embodiments of the present disclosure.

The following is a description of the group-based opinion dynamics model on which the problem of finding optimal means of opinion control is based. This model extends the bounded confidence opinion dynamics model (see Literature Reference No. 3) to a setting in which 1) a population of agents transition between active and inactive states; 2) active agents interact with one another in communal nodes in a community network (e.g., group-based social networking websites like Reddit™); 3) agents have heterogeneous preferences over entry points (groups) into this network, reflecting community membership; and 4) agents transition between communities stochastically. These processes are summarized in Algorithms 1, 2, and 3. A diagram of the system described herein is presented in FIG. 3, showing that inputs (element 300) into the system consist of model parameters (element 302), such as the number of controllers (n) and a target opinion value (y). The Dynamics Simulator (element 304) includes Algorithm 3 (element 306) and Algorithm 4 (element 308). Algorithms 1 and 2 are subroutines of Algorithm 3 (element 306). The output (element 310) of the system is a control strategy, or optimal control schedule (r). The control schedule is then deployed in the social media network (element 312). Non-limiting examples of values of the control schedule include input parameters for an email campaign implemented by an email marketing company, a sales force, or constant contact via the social media network to influence public opinion. Non-limiting examples of input parameters include frequency of automatic email generation and transmittal to users and frequency of postings to social media platforms.

(4.1.1) Model Specifications

Let G=(V, E) be a graph with node set V consisting of n nodes. The nodes in G represent public forums where individuals can gather to interact with one another and where interactions provide opportunities for agents to update their opinions. Edges (u, v)∈E are directed and weighted such that the weight $w_{uv}$ of an edge between u and v is such that $0 \leq w_{uv} \leq 1$. These weights represent the tendency of movement or flow of the population from one group (node in graph G) to another.

Let M={1, . . . , m} be a population of individuals/agents where each individual i∈M maintains an opinion $x_i \in [0, 1]$. At any given time t, some agents will be "in" nodes in G while the rest are "outside" of G. The nodes that are "in" G at time t are said to be engaged at time t, and this set is denoted by M(t)⊆M, and $\overline{M}(t)$=M\M(t) is used to denote the remaining (disengaged) agents. Each engaged agent occupies a node in G, and many such agents can occupy any given node. Let $M_v(t) \subset M(t)$ denote the engaged agents that are in node v∈V at time t.

Individuals have heterogenous characteristics that are realized by different degrees of susceptibility to influence and engagement behaviors. In particular, the behavior of each agent i∈M is characterized by their type $\theta_i = \langle p_i, q_i, \rho_i, c_i, \tau_i, \alpha_i \rangle$, where $p_i$ is the probability that i becomes engaged in the current time step when they were disengaged previously; $q_i$ is the probability that i transitions from engaged to disengaged; $\rho_i(v)$ is the probability that, upon becoming engaged, i enters into G via node v; $c_i \in [0, 1]$ is i's consumption rate, which determines the number of interactions i has with others in a given time step when it is engaged; $\tau_i \in [0,1]$ is a threshold that determines whether i's opinion $x_i$ is close to another opinion $x_j$; i.e., the opinions are close if $|x_i - x_j| \leq \tau_i$; and $\alpha_i \in (0, 1)$ parameterizes how susceptible i is to being influenced by another agent j when j's opinion is close to i's.

Movement of individuals between nodes or communities is outlined in Algorithm 1, which describes how agents become (dis)engaged or move between nodes in each time step. Specifically, in each time step t, each disengaged agent i∈$\overline{M}$(t−1) becomes engaged with probability $p_i$ and each engaged agent i∈M(t−1) becomes disengaged with probability $q_i$. When a disengaged agent i∈$\overline{M}$(t−1) becomes engaged, they enter into a node in G according to the distribution $\rho_i$. For already engaged agents i∈$M_v$(t−1) who remain engaged in time t, they transition from node v to u∈N(v) with probability proportional to $W_{vu}$.

---

Algorithm 1: Population Activation and Movement Update

---

Require: M(t − 1), $\overline{M}$(t − 1), and $M_v$(t − 1) for all v ∈ V be defined appropriately (e.g., by previous iterations of this algorithm).
M(t) ← ∅
$\overline{M}$(t) ← ∅
$M_v$(t) ← ∅ for all v ∈ V
for i ∈ M do
  if i ∈ M do
    if i ∈ M(t − 1) then
      if flip($q_i$) = true then
        $\overline{M}$(t) ← $\overline{M}$(t) ∪ {i}
      else

---

-continued

---

Algorithm 1: Population Activation and Movement Update

---

M(t) ← M(t) ∪ {i}

$v' \overset{\$}{\leftarrow} N_v V,$ where v is the node such that i ∈ $M_v$(t − 1)
        and transition probabilities from v to a neighbor
        v' ∈ N(v) are proportional to the edge weight $w_{vv'}$.
        $M_{v'}$(t) ← $M_{v'}$(t) ∪ {i}, and N(v) is the
        neighborhood of node v.
      end if
    else if i ∈ $\overline{M}$(t) then
      if flip($p_i$) = true (flip(p) is a function that returns true
      with probability p) then
        M(t) ← M(t) ∪ {i}

$v' \overset{\$}{\leftarrow} \rho_i$

$M_v$(t) ← M(t) ∪ {i}
      else
        $\overline{M}$(t) ← $\overline{M}$(t) ∪ {i}
      end if
    end if
end for
return M(t), $\overline{M}$(t), and $M_v$(t) for all v ∈ V

---

As outlined in Algorithm 2, regular (non-control) agents that are engaged/active in the current time step have the opportunity to update their opinions based on their interactions with others with whom they share a node in the current time step. Each agent is influenced by other agents who 1) share the same community, and 2) have an opinion close enough to their own. Consider an engaged individual i∈$M_v$(t) in node v. Let $C_i$ be a random subset of a $c_i$ fraction of other agents in $M_v$(t). The agents in $C_i$ can be thought of as those that i encounters in the current time step. Let $C_i' = \{j \in C_i | \tau_i \geq |x_i(t-1) - x_j(t-1)|\}$ be the agents in $C_i$ whose opinions (carried over from the previous time step) are close enough to i's own opinion for i to be willing to consider them. Agent i updates their opinion $x_i(t)$ using the adjustment rule according to the following:

$$x_i(t) = (1 - \alpha_i)x_i(t-1) + \frac{\alpha_i}{|C_i'|} \sum_{j \in C_i'} x_j(t-1). \quad (1)$$

---

Algorithm 2: Stochastic Bounded-Confidence Opinion Update
(for regular (non-control) agents

---

Require: $M_v$(t), for all v ∈ V, is updated as in Algorithm 1
Require: $x_i$(t − 1) ∈ [0,1] for all agents i ∈ M
for v ∈ V do
  for i ∈ $M_v$(t) do
    $C_i$ ⊂ $M_v$(t) is randomly selected such that $|C_i|/|M_v(t)| = c_i$
    $C_i' \leftarrow \{j \in C_i | \tau_i \geq |x_i(t-1) - x_j(t-1)|\}$     $x_i(t) \leftarrow (1 - \alpha_i)x_i(t-1) + \frac{\alpha_i}{|C_i'|} \sum_{j \in C_i'} x_j(t-1)$   end for
end for
return $x_1$(t), . . . , $x_m$(t)

---

Algorithm 3 combines Algorithms 1 and 2 into one cohesive opinion dynamics model, in which each time step entails updating both community (node) membership and current opinions. Algorithm 3 is built using Algorithms 1 and 2 as sub-procedures.

---
Algorithm 3: Dynamics
---

Require: Initial opinions $x_i(0) \in [0,1]$ for all $i \in M$
Require: Parameter $T \in \mathbb{Z}_+$ is the maximum number of time steps
   for t = 1, 2, ..., T do
      $M(t), \overline{M}(t), M_v(t)(\forall v \in V)$ is updated for time t by Algorithm 1
      $x_i(t), \forall i \in M$ is updated for time t by Algorithm 2
   end for
return $x_i(T), ..., x_m(T)$

---

Model parameters (element 302) are input by the end user of the system, and have presumably been extracted from social media data. The following are examples of how a user might extract these parameters from social data prior to using the system described herein. Consider a population of users interacting with a social media platform for a given period of time. A user can have multiple active sessions during this time, with each active session defined as a session in which the time between the user's comments do not exceed (arbitrarily chosen) x time steps. Parameters $p_i$ and $q_i$, which determine agent engagement, can be estimated by extracting information about activity levels within and between sessions. $p_i$ can be estimated using average inter-arrival rates (i.e., time between the start of each activity session) for each user. Here, a lower average inter-arrival rate corresponds to higher probability $p_i$ of becoming engaged. $q_i$ can be estimated based on the average session length, or the time between the start of a session and the last comment made in the session. The shorter the average session length of a user, the higher the probability $q_i$ that a user will be become disengaged once engaged. Note that given the average inter-arrival rates and session lengths for each user, one is able to fit the data to a distribution that can be used to generate synthetic data if necessary.

Parameter $w_{vu}$, which measures the rate of intergroup movement, can be estimated by creating a Markov chain of user movement based on the sequence of movements from all active sessions. Each Markov chain would begin at an abstract "start" state and end at an abstract "end" state, with the sequence of movement between communities represented in between. An alternative method might be to use the weights of the co-membership community network. The greater the number of members two communities share, the more likely agents are to move between them.

Parameter $\rho_i$, which determines community (or group) membership, can be estimated using the proportion of time spent commenting in each community (group). One can compute the average proportion of the total session length spent in each community, giving an estimate of $\rho_i$. For an even simpler model, one can first group users based on session length, characterizing classes of users instead of setting $\rho_i$ individually.

Initial opinions $x_i(t)$ of the population of regular (non-control) agents on a given topic can be estimated by running a sentiment analysis model (e.g., VADER (see Literature Reference No. 2)) on related comments such that each comment is given a score between 0 and 1. Parameter c can be estimated based on the observed average number of neighbors each user interacts with during active sessions. Finally, $\tau$ and $\alpha$ should be chosen by the end user based on personal knowledge of the population and network. These are system parameters that convey the population's susceptibility to influence, and the values are determined by a domain expert.

(4.1.2) Control Strategy Algorithm

Given a social network, its parameters (as described in the previous section), and expected opinion dynamics as laid out by the group-based model, the system according to embodiments of the present disclosure seeks to find an efficient control strategy that involves placing control agent(s) into the population. Each control agent uses some defined rule for updating their opinion in each time step, which is used instead of the bounded-confidence update rule used for regular agents. This update rule is referred to as the agent's control strategy. For example, in a simple control strategy one can have control agents s hold initial opinions $x_s(0)=1$ at time 0, and update their opinions using the rule $x_s(t)=x_s(t-1)-r$ for some constant $r \in (0,1]$. The control strategy algorithm is meant to determine 1) the number of control agents n and 2) the control schedule r necessary to herd the population's opinion into a target regime. Ideally, the number of control agents should be kept as small as possible since it may be expensive to insert control agents into the population for extended periods of time.

In order to find an efficient control strategy, a search is performed over the possible parameters $r \in (0, 1]$ and $n \in [1, n_{max}]$, where $n_{max}$ is proportional to $|M|$. For each randomly chosen combination of these parameters, n control agents are inserted into the population M, and a version of Algorithm 3 is run in which 1) control agents never become inactive (i.e., are always present in the group) and 2) control agents update their opinions according to the rule given the chosen r value. While the control agents are not influenced by other agents, the regular agents in the population are influenced by control opinions if there are control agents in $C_i$. After a specified maximum number of iterations (i.e., number of random parameter combinations to try), the parameters with the maximum number of agents $i \in M$ with opinions in the target opinion regime are chosen. A description of a simplified variant of this procedure (with n given as a constant) is presented in Algorithm 4.

---
Algorithm 4: A Simple Control Algorithm
---

Require: Initial opinions $x_i(0) \in [0,1]$ for all $i \in \{1, ..., m\}$
Require: Parameter $y \in \{0,1\}$ is target opinion value
Require: Parameter G = (V, E) is group network
Require: Parameter $n \in \mathbb{Z}_+$ to be number of controllers
   $x' \leftarrow |1 - y|$
Set initial opinions for controllers $x_i(0) = x'$ for all controllers $i = \{m + 1, m + 2, ..., m + n\}$
   Set controller behavior patterns $p_i = 1, q_i = 0, \rho_i =$Uniform(V) for controllers $i = \{m + 1, m + 2, ..., m + m'\}$
$j \leftarrow 0$
repeat Algorithm 4: A Simple Control Algorithm $j \leftarrow j + 1$
$r \leftarrow 1/j$
Set controllers update policy to $x_i(t) \leftarrow x_i(t-1) - (-1^j r)$ and compute average time-T opinions $\bar{x}(T)$
until $j = T$ or $\bar{x}(T) = y$
return $(x', r)$ The control strategy to be used by the control agents is defined by different opinion values $x_s$ over a number of time steps. Each opinion value $x_s$ represents the level of sentiment to be expressed toward the given topic (with "0" being negative and "1" being positive). The analyst or end user of the system is able to use the values, combined with the given topic, to generate text and/or images that express the given sentiment. In very high-stakes situations, a human should determine the appropriate text based on the given sentiment value. An alternative would be to use a text generator, such as SentiGAN (see Literature Reference No. 6) or similar, that is able to generate text based on the desired level of sentiment.

(4.2) Experimental Studies

Figure 4A:
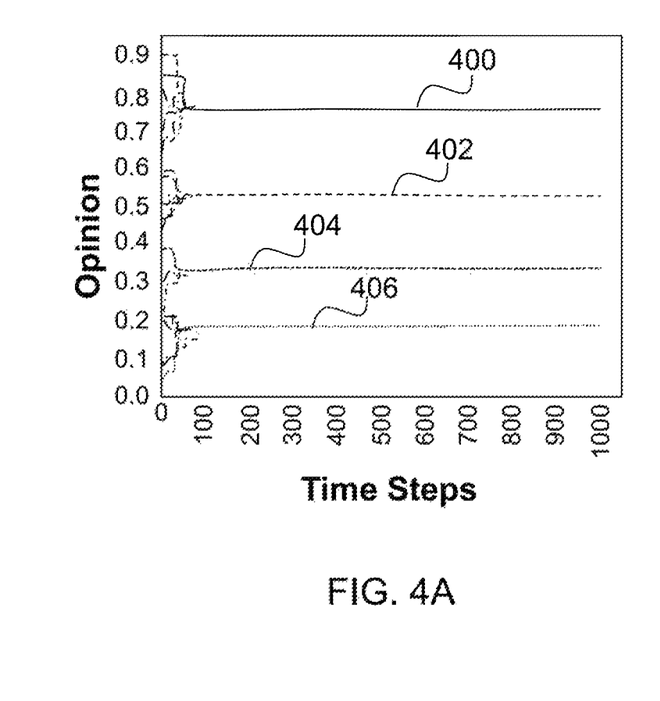
FIG. 4A is a plot graph illustrating a baseline simulation involving a population of 100 agents without any controllers, where each line traces an individual agent's opinion over time according to some embodiments of the present disclosure.
Figure 4B:
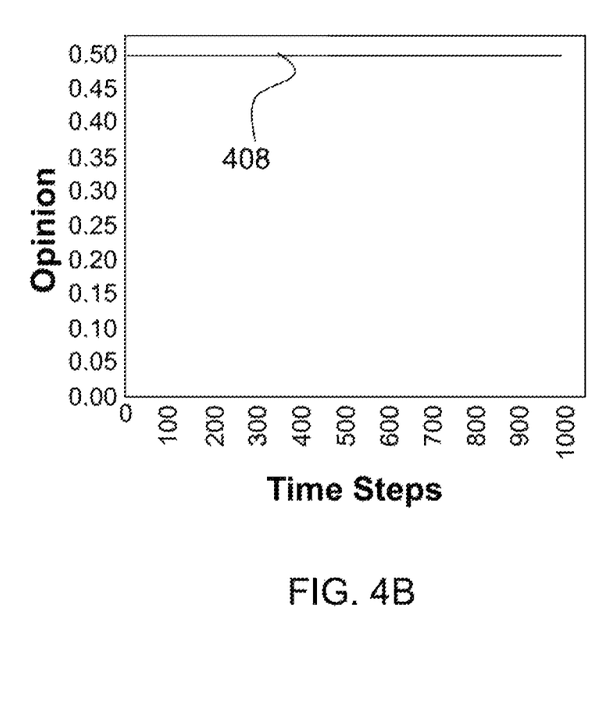
FIG. 4B is a plot graph illustrating a mean opinion trace of the entire population of 100 agents according to some embodiments of the present disclosure.

This section describes representative simulations run using the system according to embodiments of the present disclosure. FIG. 4A illustrates typical opinion change patterns under the group-based model without control agents (controllers). Each line represents the opinion trajectory of an agent in the population. Over time, opinions converge into "opinion clusters" (depicted as a single line (e.g., elements 400, 402, 404, 406)), such as separated by at least the given threshold $\tau_i$. FIG. 4A depicts results from a baseline simulation involving a population of 100 agents without any controllers. From FIG. 4A one can see that the opinion clusters form in a steady state, where the distance between clusters is determined by the bounded confidence threshold parameter $\tau$. FIG. 4B depicts the mean opinion trace (element 408) of the entire population.

The parameters for this experiment were chosen for demonstration purposes and were not intended to approximate those for any particular social network dataset. For this experiment the selections were $p_i=0.5$, $q_i=0.5$, $\alpha_i=0.5$, $c_1=0.5$, and $$\tau_i = \frac{1}{15}.$$

As shown in FIG. 4A, the initial opinions were normally distributed with a third of population distributed around mean 0.75, another third around mean 0.5, and the remaining third around mean 0.25, parameter $\rho_i=[100]$ indicating that all users preferred to enter through community one, and the transition matrix W was equal to:

$$W = \begin{bmatrix} \frac{1}{2} & \frac{1}{4} & \frac{1}{4} \\ \frac{1}{2} & \frac{1}{2} & 0 \\ \frac{1}{2} & 0 & \frac{1}{2} \end{bmatrix}.$$

Figure 5A:
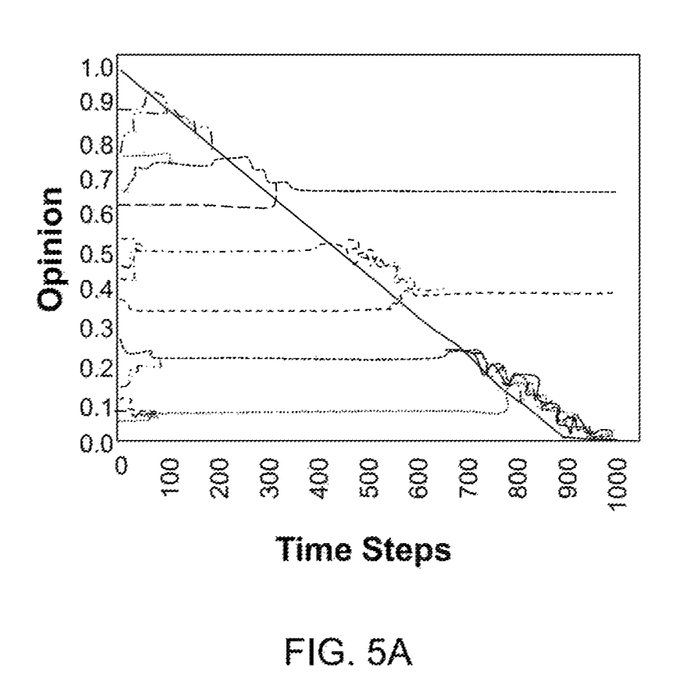
FIG. 5A is a plot graph illustrating opinion traces with one controller according to some embodiments of the present disclosure.
Figure 5B:
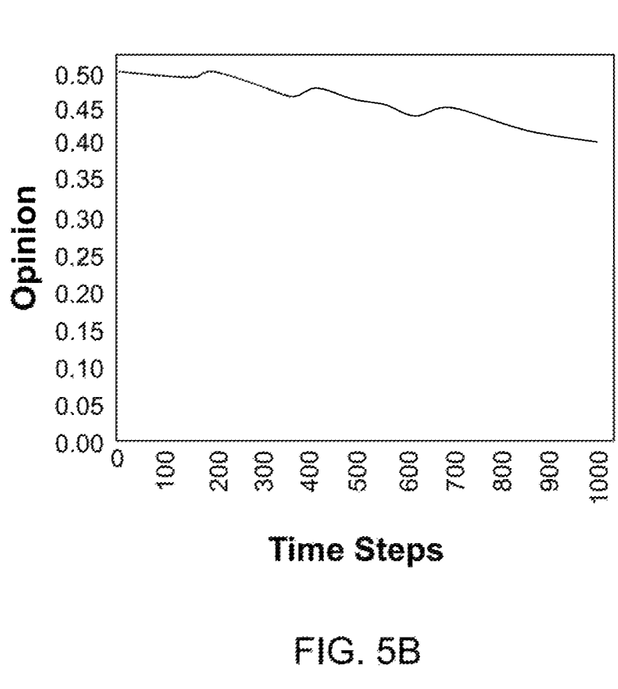
FIG. 5B is a plot graph illustrating mean opinion traces with one controller according to some embodiments of the present disclosure.
Figure 5C:
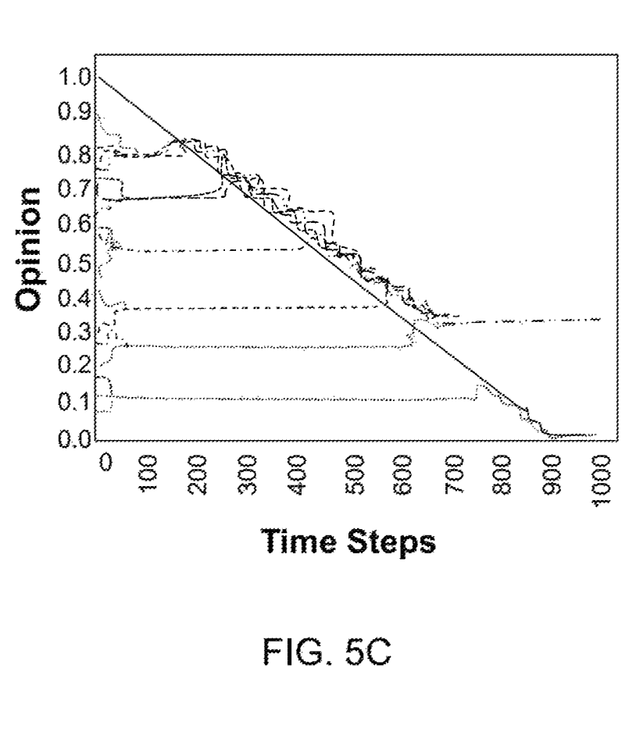
FIG. 5C is a plot graph illustrating opinion traces with three controllers according to some embodiments of the present disclosure.
Figure 5D:
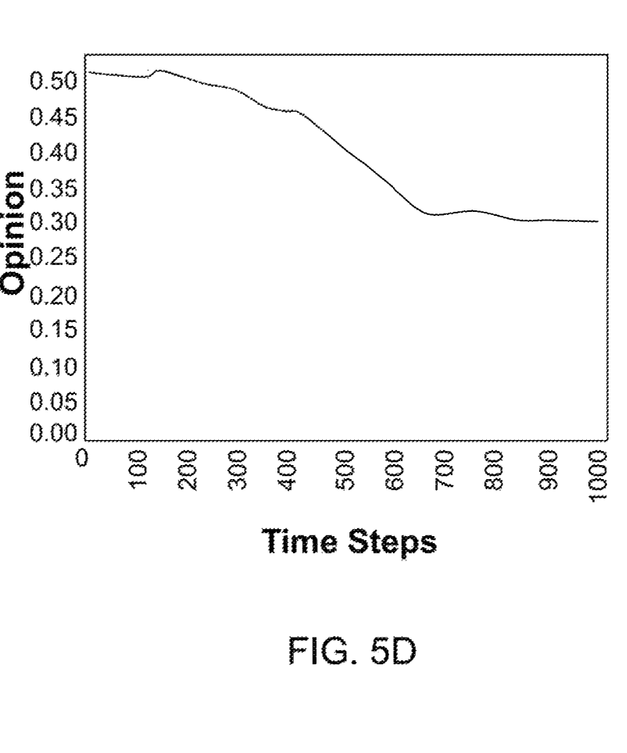
FIG. 5D is a plot graph illustrating mean opinion traces with three controllers according to some embodiments of the present disclosure.
Figure 5E:
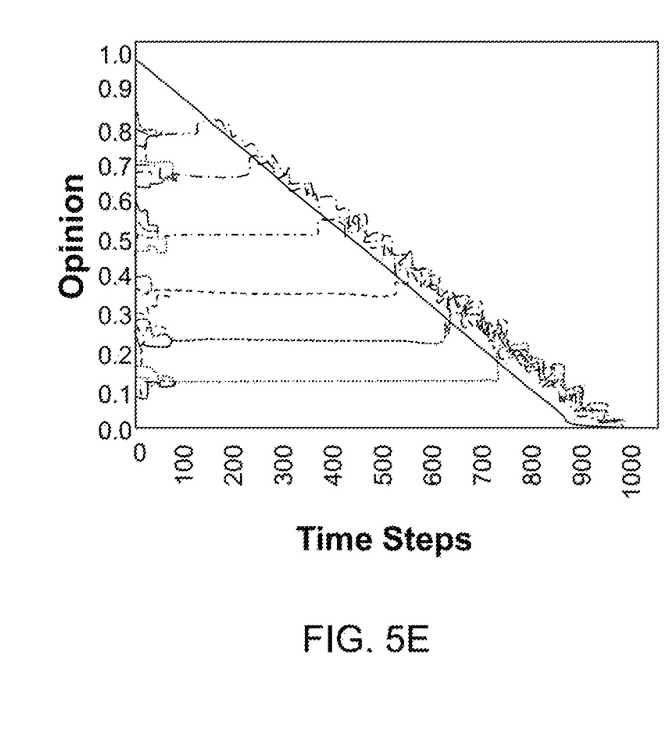
FIG. 5E is a plot graph illustrating opinion traces with five control agents according to some embodiments of the present disclosure.
Figure 5F:
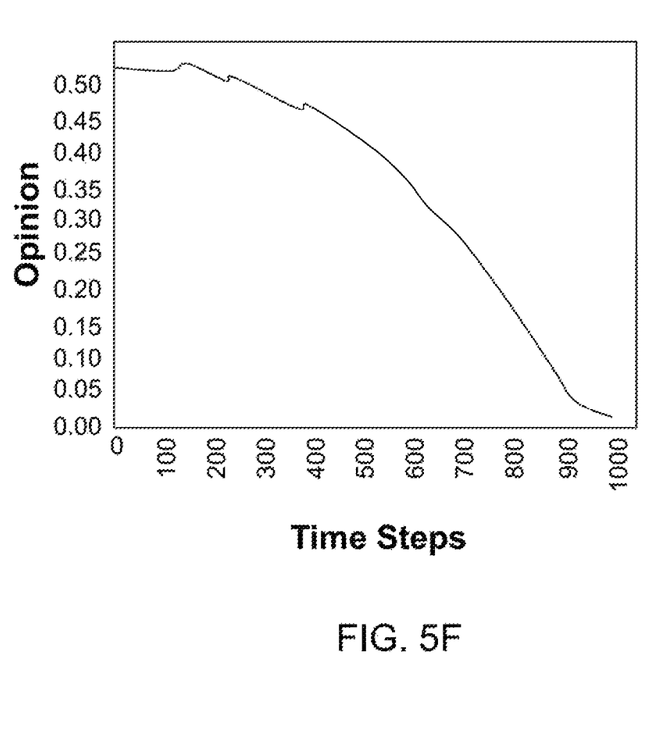
FIG. 5F is a plot graph illustrating mean opinion traces with five controllers according to some embodiments of the present disclosure.

FIGS. 5A-5F show the effectiveness of control strategies used in the same population as illustrated in FIGS. 4A and 4B with a target opinion regime of $x_i=0$ for all agents i. FIG. 5A depicts opinion traces with one controller, and FIG. 5B depicts mean opinion traces with one controller. FIG. 5C illustrates opinion traces with three controllers, and FIG. 5D illustrates mean opinion traces with three controllers. FIG. 5E shows opinion traces with five controllers (or control agents), and FIG. 5F shows mean opinion traces with five controllers. The control scheme in this scenario involves activating $k \in \{1,3,5\}$ identical control agents whose opinions start at $x(0)=1$ and update according to $x(t)=\delta x(t-1)$ for a small value of $\delta(=1/900$ here), which represent updates for an example control strategy used by control agents. The system uses a simple linear control strategy in which control agents start by expressing an opinion of $x_s=1$ and linearly update that opinion using the rule $x_s(t)=x_s(t-1)-r$ for $$r = \frac{1}{900},$$

which is an arbitrary choice mean to be a slow decrease in expressed opinion over time. For just one controller (or control agent), this strategy is not sufficient, as evidenced by the mean opinion traces with one controller (FIG. 5B) not driving the mean opinion to the target opinion regime of 0. However, with five control agents, the system is able to drive mean opinion down to the target opinion of 0, as depicted in FIG. 5F.

This invention described herein is a system that may be used by an analyst (e.g., a campaign official, advertising professional, intelligence operative) to aid in identifying effective opinion control strategies to be deployed in social media systems. The system takes in a set of parameters that describe the individual and community movement and interaction patterns in the social media system, and outputs a prescribed opinion control strategy to be enacted by the analyst or decision maker using supplemental (human or bot) resources at their disposal. The control strategy specifies a schedule of sentiment expression over a period of time to be expressed by the control agents (external agents at the disposal of the analyst or decision maker) embedded in the population. The system according to embodiments of the present disclosure can be utilized to influence public opinions in several domains, including, but not limited to, advertising, marketing, public relations, and political campaigns. For instance, in a company engaged in advertising and public relations strategies, especially those that have a significant social media presence or products discussed on social media platforms, the invention described herein can be used to increase public appetite for a consumable good (e.g., Coke vs. Pepsi) or increase brand recognition leading to more customers and sales.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for identifying a control strategy for guiding opinions of users of a social media network, the system comprising:
one or more processors and a non-transitory computer-readable medium having executable instructions encoded thereon such that when executed, the one or more processors perform an operation of:
determining a number of control agents to be inserted into a population of users of the social media network, wherein each user has an opinion regarding a topic;
determining a rate at which an expressed opinion of each control agent should change over a period of time;
outputting a control strategy,
wherein the control strategy comprises a control schedule based on the number of control agents to be inserted into the population of users and the rate at which the expressed opinion of each control agent should change over the period of time;
inserting the determined number of control agents into the population of users;
causing the determined number of control agents to express their opinions in the social media network according to the control schedule; and
actuating changes in the opinions of the population of users regarding the topic toward a target opinion state.

2. The system as set forth in claim 1, wherein the one or more processors further perform an operations of:
determining a set of input parameters associated with the social media network;
using the set of input parameters, determining the number of control agents to be inserted into the population of users; and
using the set of input parameters, determining the rate at which the expressed opinion of each control agent should change over the period of time.

3. The system as set forth in claim 2, where in determining the set of input parameters, the one or more processors determines arrival and departure rates of engagement with the social media network for each user in the population of users.

4. The system as set forth in claim 2, where in determining the set of input parameters, the one or more processors determines a length of time of engagement with the social media network for each user in the population of users.

5. The system as set forth in claim 2, where in determining the set of input parameters, the one or more processors determines a group membership and a rate of inter-group movement for each user in the population of users.

6. A computer implemented method for identifying a control strategy for guiding opinions of users of a social media network, the method comprising an act of:
causing one or more processors to execute instructions encoded on a non-transitory computer-readable medium, such that upon execution, the one or more processors perform operations of:
determining a number of control agents to be inserted into a population of users of the social media network, wherein each user has an opinion regarding a topic;
determining a rate at which an expressed opinion of each control agent should change over a period of time;
outputting a control strategy,
wherein the control strategy comprises a control schedule based on the number of control agents to be inserted into the population of users and the rate at which the expressed opinion of each control agent should change over the period of time;
inserting the determined number of control agents into the population of users;
causing the determined number of control agents to express their opinions in the social media network according to the control schedule; and
actuating changes in the opinions of the population of users regarding the topic toward a target opinion state.

7. The method as set forth in claim 6, wherein the one or more processors further perform operations of:
determining a set of input parameters associated with the social media network;
using the set of input parameters, determining the number of control agents to be inserted into the population of users; and
using the set of input parameters, determining the rate at which the expressed opinion of each control agent should change over the period of time.

8. The method as set forth in claim 7, where in determining the set of input parameters, the one or more processors determines arrival and departure rates of engagement with the social media network for each user in the population of users.

9. The method as set forth in claim 7, where in determining the set of input parameters, the one or more processors determines a length of time of engagement with the social media network for each user in the population of users.

10. The method as set forth in claim 7, where in determining the set of input parameters, the one or more processors determines a group membership and a rate of inter-group movement for each user in the population of users.

11. A computer program product for identifying a control strategy for guiding opinions of users of a social media network, the computer program product comprising:
computer-readable instructions stored on a non-transitory computer-readable medium that are executable by a computer having one or more processors for causing the processor to perform operations of:
determining a number of control agents to be inserted into a population of users of the social media network, wherein each user has an opinion regarding a topic;
determining a rate at which an expressed opinion of each control agent should change over a period of time;
outputting a control strategy,
wherein the control strategy comprises a control schedule based on the number of control agents to be inserted into the population of users and the rate at which the expressed opinion of each control agent should change over the period of time;

inserting the determined number of control agents into the population of users;

causing the determined number of control agents to express their opinions in the social media network according to the control schedule; and actuating changes in the opinions of the population of users regarding the topic toward a target opinion state.

12. The computer program product as set forth in claim 11, further comprising instructions for causing the one or more processors to further perform operations of:

determining a set of input parameters associated with the social media network;

using the set of input parameters, determining the number of control agents to be inserted into the population of users; and using the set of input parameters, determining the rate at which the expressed opinion of each control agent should change over the period of time.

13. The computer program product as set forth in claim 12, where in determining the set of input parameters, the one or more processors determines arrival and departure rates of engagement with the social media network for each user in the population of users.

14. The computer program product as set forth in claim 12, where in determining the set of input parameters, the one or more processors determines a length of time of engagement with the social media network for each user in the population of users.

15. The computer program product as set forth in claim 12, where in determining the set of input parameters, the one or more processors determines a group membership and a rate of inter-group movement for each user in the population of users.

* * * * *